(No Model.)
F. LORENZ.
PROCESS OF AND APPARATUS FOR OBTAINING AMMONIA.
No. 277,041. Patented May 8, 1883.
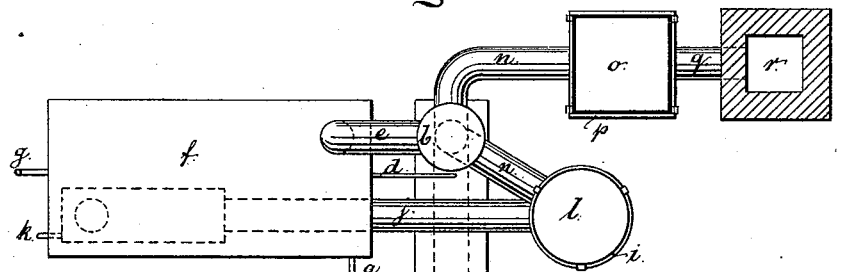
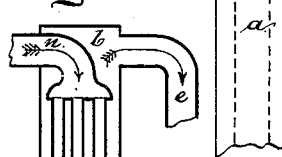
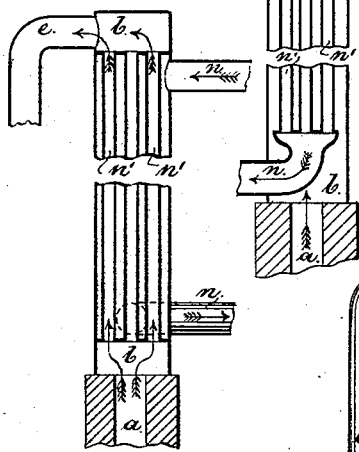
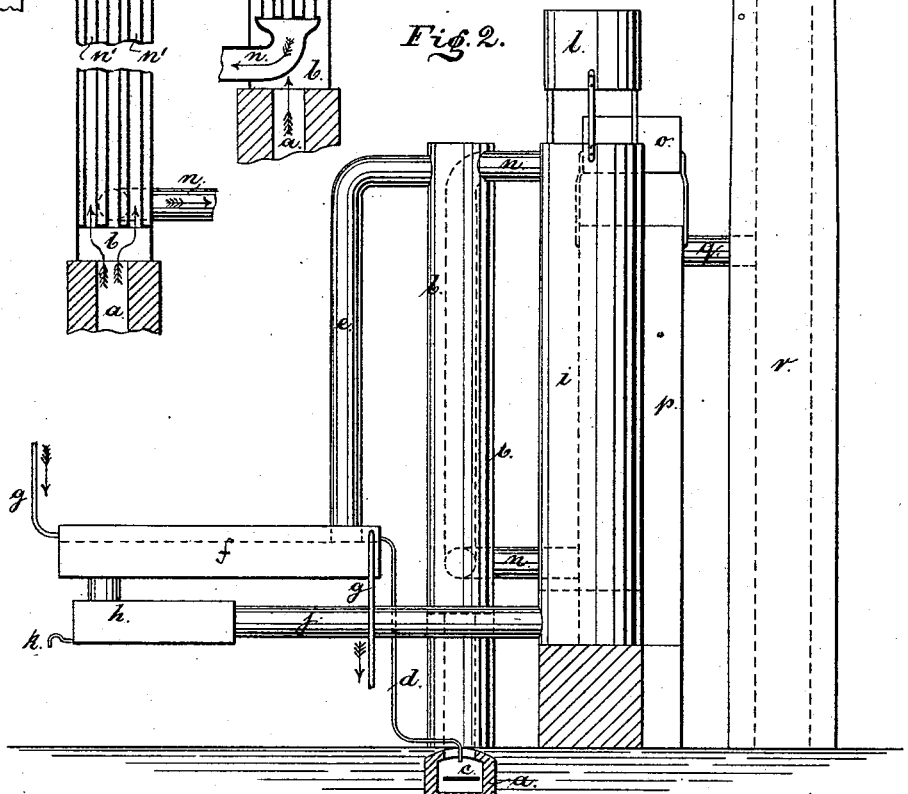

UNITED STATES PATENT OFFICE.

FRIEDRICH LORENZ, OF RENDSBURG, PRUSSIA, GERMANY.

PROCESS OF AND APPARATUS FOR OBTAINING AMMONIA.

SPECIFICATION forming part of Letters Patent No. 277,041, dated May 8, 1883.

Application filed December 12, 1882. (No model.) Patented in Germany May 14, 1882.

*To all whom it may concern:*

Be it known that I, FRIEDRICH LORENZ, director of the establishment "Chemische Duengerfabrik Rendsburg," of Rendsburg, in the Kingdom of Prussia, German Empire, have invented an Improvement in the Process of and Apparatus for Obtaining Ammonia, of which the following is a full and clear description, reference being had to the accompanying drawings, which form part of this specification, and in which the same letters indicate corresponding parts in all figures.

Figure 1 is a plan of the improved apparatus used in the new process. Fig. 2 is a vertical elevation of it. Fig. 3 shows a modification of a part of the apparatus. Fig. 4 shows another modification.

The hot gases of bone or other furnaces containing ammonia are carried through the channel $a$ to the vertical tube $b$, of large diameter. In the channel $a$ is provided a large iron plate, $c$, which is heated by the hot passing gases, so that water flowing through the pipe $d$ upon this plate $c$ is evaporated and mixed in the form of steam with the gases. This steaming of the gases greatly facilitates the separation of the ammonia from the non-condensable part of them, as well in the cooler as in the towers. The gases go from the top of the tube $b$ through pipe $e$ into the large shallow cooler $f$, the upper part of which is filled with cold flowing water, and decreases the temperature of the gases.

$g\ g$ are water-pipes. From the basin the pipe $d$ carries the water to the above-mentioned plate $c$. The gases pass through a pipe in the bottom of the cooler $f$ into the smaller vessel, $h$, and from there through the pipe $j$ into the lower part of the tower $i$. The tower $i$, made of sheet-iron, is filled with pieces or lumps of chamotte or other suitable materials, upon which drips the fluid of the reservoir $l$ at the beginning of the operation, consisting of water, presenting a very large absorbing-surface to the gases in their passage from the bottom to the top of the tower $i$. The lye, arrived at the bottom of the tower $i$, flows back through the pipe $j$ into the vessel $h$, and is drawn off by the trapped pipe $k$. The remaining gases containing still ammonia are carried through the pipe $n$ to a second—the acid—tower $p$, filled also with pieces or lumps of chamotte or other suitable materials, which are wetted with diluted sulphuric acid dripping down from the reservoir $o$ on top of the tower $p$. Notwithstanding the diluted acid has a great affinity for the ammonia, its absorbing-power is increased when the gases in hot state are brought in contact with the acid, as the oscillatory motions of the molecules of the formed product are increased by heat, facilitating the absorption of the ammonia. To profit by this experience, the pipe $n$, leading from the tower $i$ to the tower $p$, is carried through the tube $b$, carrying the hot gases from $a$ to $f$. The hot gases give off a portion of their heat to the cold gases passing through the pipe $n$, so that the latter enter the lower part of the acid-tower $p$ in a hot state. The absorption may be supported by the additional employment of steam injected into the tower. The gases in the tower $p$ leave it cooled and deprived of all ammonia through the pipe $q$ on top of the tower, and are carried off by the chimney $r$. The ammonia containing acidulated fluid passes into a reservoir, (not shown in the drawings,) and it is from there, after having been saturated with the lye running from the tower $i$, either evaporated for giving sulphate of ammonia, or it is pumped again into the reservoir $l$, to be employed in lieu of water.

To increase the heating action of the hot gases in the tube $b$, the pipe $n$ may form, as far as it is jacketed by the tube $b$, not a single pipe, but a bundle of smaller pipes, Fig. 3, presenting a larger heat-absorbing surface; or the cold gases may, as in Fig. 4, be surrounded by a bundle of pipes, through which the hot gases are passing.

It must be remarked that the construction of the cooler $f$ may be varied according to local circumstances, to the temperature of the entering gases, and other causes important to the manufacture, as well as the size and position of the single parts of the apparatus, without leaving the ground of the invention.

I know very well that the obtaining of ammonia from the gases of furnaces is old; but What I consider as new, and want to secure by Letters Patent, is—

1. The process of obtaining ammonia from the hot gases of bone and other furnaces by first mixing them with water vapors or steam; second, cooling the mixture and collecting the ammonia-containing fluid; third, carrying the remaining gases through a tower filled with lumps of chamotte, &c., in a direction opposed to the water or diluted lye of sulphate of ammonia, which, dripping from a reservoir on top of the tower, wets its contents and absorbs the ammonia; fourth, the treatment of the remaining gases, after heating them during their passage to a second tower, similar to the water-tower, with diluted acid in this second tower, into which steam may be admitted; fifth, mixing the fluid product with the ammonia-containing fluid from the first tower; and, sixth, reusing in the tower or towers the fluid product until it has absorbed enough ammonia, carried out substantially as described, and with an apparatus substantially as shown and described.

2. An apparatus for the purpose of obtaining ammonia from the gases of bone and other furnaces by the described process, consisting of the iron plate $c$ in the channel $a$, the tube $b$, the cooler $f$, the vessel $h$, the water-tower $i$, with its reservoir $b$, the second or acid tower, $p$, with its reservoir $o$, and the connecting-pipes $e\,j\,n\,q$, of which $b$ serves as a heater for the jacketed part of the pipe $n$, working and arranged substantially as shown and described.

3. The metallic plate $c$ in the channel $a$, heated by the gases from bone or other furnaces, in combination with water-conveying pipe $d$, for the purpose of mixing the gases with the produced aqueous vapor or steam, substantially as shown and described.

4. The tube $b$, in combination with the towers $i$ and $p$ and pipe $n$, which pipe is jacketed by the tube $b$ for the purpose of heating, alone or in combination with steam, the gases passing from the water-tower $i$ to the acid-tower $p$, substantially as shown and described.

This specification signed by me this 30th day of October, 1882.

FRIEDRICH LORENZ.

Witnesses:
P. H. EGGERT,
W. FRAHM.